United States Patent [19]  [11] 3,988,225
Schulze  [45] Oct. 26, 1976

[54] METHOD OF PREVENTING THE SUPERSATURATION OF ELECTROLYTE SOLUTIONS WITH ONE OR MORE OF THE IMPURITIES ARSENIC, ANTIMONY AND BISMUTH, IN THE ELECTROLYTIC REFINING OF NONFERROUS METALS, ESPECIALLY COPPER

[75] Inventor: Reinhold Schulze, Seevetal, Germany

[73] Assignee: Norddeutsche Affinerie, Hamburg, Germany

[22] Filed: May 12, 1975

[21] Appl. No.: 576,256

Related U.S. Application Data

[63] Continuation-in-part of Ser. No. 352,079, April 17, 1973, Pat. No. 3,887,448.

[30] Foreign Application Priority Data

May 13, 1974  Germany............................ 2422973

[52] U.S. Cl............................... 204/130; 210/30 R; 210/34; 210/36; 210/38 B; 210/204; 204/108
[51] Int. Cl.²........................................... C25C 1/22
[58] Field of Search .................. 210/30, 34, 36, 38, 210/204; 204/108, 130

[56] References Cited
UNITED STATES PATENTS

| | | | |
|---|---|---|---|
| 2,387,714 | 10/1945 | Briggs .................................. | 210/36 |
| 3,696,012 | 10/1972 | Schulze............................... | 204/108 |
| 3,887,448 | 6/1975 | Schulze............................... | 204/130 |

*Primary Examiner*—R. L. Andrews
*Attorney, Agent, or Firm*—Karl F. Ross; Herbert Dubno

[57] ABSTRACT

A process for the prevention of supersaturation of electrolytes from nonferrous metal refining (preferably copper refining) with arsenic, antimony and bismuth in which the electrolyte solution is brought into contact with a chemisorption agent on a flat substrate. The substrate with the chemisorption agent is brought into a compact form with neighboring substrates and is enclosed in a protective housing before being contacted with the electrolyte.

9 Claims, 3 Drawing Figures

3,988,225

METHOD OF PREVENTING THE SUPERSATURATION OF ELECTROLYTE SOLUTIONS WITH ONE OR MORE OF THE IMPURITIES ARSENIC, ANTIMONY AND BISMUTH, IN THE ELECTROLYTIC REFINING OF NONFERROUS METALS, ESPECIALLY COPPER

CROSS REFERENCE TO RELATED APPLICATION

This application is a continuation-in-part of application Ser. No. 352,079 filed 17 Apr. 1973 (now U.S. Pat. No. 3,887,448).

FIELD OF THE INVENTION

The present invention relates to a process for preventing the supersaturation of an electrolyte solution with one or more of the impurities arsenic, antimony and bismuth, in the electrolytic refining of nonferrous metals, especially copper, and to a process for removal of these impurities from refining electrolyte solutions which operate with anodes containing a high level of these impurities. More particularly, the invention relates to the removal of such impurities from these electrolytes by bringing the electrolytes into contact with a large-area chemisorption agent as described generally in the aforementioned application.

BACKGROUND OF THE INVENTION

The aforementioned application describes a process whereby arsenic, antimony and bismuth, present as impurities in electrolytes, can be removed in a simple manner by chemisorption without multistage treatment of the electrolyte so that the latter can be recirculated to non-ferrous-metal refining baths and super saturation of the impurities in the electrolyte is prevented.

This process makes use of a floating chemisorption agent in that the chemisorbent is applied to a floating substrate. The process involves chemisorption to remove the impurities from the electrolyte, followed by regeneration of the chemisorbent by treating it with regenerating agent.

The cycling of the chemisorption agent in this manner results in degradation of the chemisorption agent with the formation of fine-grain detritus which plugs the inlet, outlet or passages of the treating vessel and reduces the throughflow of the electrolyte. This disadvantage is all the more significant since the low solubility of the impurities makes it necessary to bring large quantities of liquid into contact with the chemisorption agent.

The floating chemisorbent, moreover, is not always able to be brought into the desired degree of intimate contact with the electrolyte.

OBJECT OF THE INVENTION

It is the object of the invention to obviate these disadvantages and provide a method of removing the specified impurities from electrolyte solutions so that the chemisorbent has a longer useful life.

SUMMARY OF THE INVENTION

This object is attained in accordance with the present invention by contacting the electrolyte solution with a chemisorption agent on a flat substrate and is brought into a compact configuration before it is contacted with the electrolyte and protectively received within a wall of a vessel.

By compacting of the chemisorption agent which consists of the chemisorbent material on the flat substrate, I mean to provide multiple layers transversely to the flat substrate with the layers in close spacing so that passages for the electrolyte are formed between the layers or within the stack or compact.

The system has the advantage that the electrolyte can flow with high velocity through the adsorber or adsorbers because sufficient through flow cross section is provided between the substrate elements carrying the chemisorbent. The electrolyte supplied to the adsorber can be removed therefrom practically completely so that no mixing of the regenerating agent with residual electrolyte can occur during subsequent regeneration. The absorber can be vented without the disadvantage that air will be trapped in the device.

The above-mentioned requirement for a "compact unit" is intended to include configurations which are composed of a stack or assembly of multiplicity of individual flat substrates, or a roll or coil of one or more flat substrates in a cylindrical configuration.

The chemisorption agent, in a compact unit, is protected, before being brought into contact with the electrolyte by a housing wall or other structure which preferably envelopes or encloses the stack.

The chemisorbent which is applied to the substrate itself is protected before the substrate is brought together with adjoining layers to form the compact unit or is enclosed in the housing, by disposing between each two substrates, a netting or gauze or a knubby or burled foil or fabric, the latter constituting a spacer between the substrates. When of course, the substrates are porous, the walls of the pores, in which the chemisorbent is received, can constitute the spacers between adjoining layers or between the contact unit and the vessel wall. When a porous substrate is used as the spacer, channels are preferably left within the substrates so that an accelerated electrolyte flow through the compact unit is possible.

The term "net or knubby foil" as used herein is intended to include wide-mesh reticulate fabrics and knit or woven fabrics with burls and the like which project from the fabric plane. The term also includes synthetic resin foils which have been provided with protruberant portions and which may be slit or corrugated to form channels. Preferably these spacer elements are flexible for purposes to be described hereinafter.

The invention is preferably carried out with a compact unit in the form of a cylindrical coil of the chemisorption agent and a net or foil. Best results are provided with a largemesh net and, while it is not critical, it is, in the interest of a large packing desnity of chemisorbent per unit volume of the reactor, desirable to use a thread thickness of the net or knubby foil or knub height which is relatively small.

It is self understood that the substrate and the other elements used in the absorber, such as the net fabric or knubby foil, must have resistance to chemical attack by the electrolyte solution. A fabric can serve as the substrate and can have a compartively smooth surface, so that the porosity is contributed by the chemisorption agent layer itself, or by the texture of a rough fabric. In either case it should be composed of polyvinyl chloride, polyethylene, polypropylene or polyester, preferably in a pre-shrunk state. The spacer fabric or net and/or knub foil may also be composed of these materials.

A porous flat substrate can also be composed of a frit of ceramic or synthetic resin (i.e. sintered ceramic or synthetic resin or mixtures thereof) as well as other open hard foams and expanded synthetic resins.

The preferred chemisorbents are low solubility metal oxides and metal oxide hydrates stable in sulfuric acid solutions, especially manganese oxide or manganese oxide hydrate and stannic acid ($SnO_2$.)

The desired solubility characteristics can be established after the compound has been applied to the substrate and/or by the use of mixed oxides and mixed oxide hydrates.

When stannic acid is used, one can operate with metallic tin, its alloys and its compounds and treat them with acid and oxidizing agents or with oxidizing acids. A special advantage resides in the use of stannic acid since it need not be employed in pure form. Thus a stannic acid may be used which contains certain amounts of these impurities which are to be removed from the electrolyte of a nonferrous metal refining process. For example, a stannic acid can be employed by conversion from calcium stannate (which is a by-product of lead refining with sodium hydroxide — Harris process —) with acids, especially dilute hydrochloric acid. This stannic acid is especially inexpensive because the calcium stannate is a low cost tin source when obtained from lead refining by the Harris process. The conversion of the calcium stannate to stannic acid is effected easily and stoichiometrically at room temperature and with dilute acid. From a low cost point of view hydrochloric acid is preferred. After washing and filtration, the stannic acid is directly usable.

The chemisorption agent disposed upon the substrate must have good adhesion, high chemical and a high reaction rate, as well as good chemical resistance. These requirements are achieved to the greatest extent and are realizable in a simple manner when the chemisorbent is applied to the substrate in the form of a solution or suspension containing, in addition, a binder mixture including at least one binder component which acts as a flocculating agent for the chemisorption agent, and a component which adheres to the substrate and is simultaneously swellable, and which is capable of retaining the chemisorbent in an adherent porous coating on the substrate.

Especially effective results are obtained when the binder contains on the one hand water insoluble or poor swellability components to provide viscosity, flexibility and adhesion, and on the other hand water soluble and water swellable components. The latter bind to the water insoluble components and thus become water insoluble so that they are not leashed from the coating. They impart to the coating, however, a certain swellability which permits maximum permeability of the reactive substances and allow reaction with the chemisorbent.

The biner preferably includes a water insoluble synthetic resin resistant to alkali and acid and preferably a paint-base type acylate ester as the pure polymerizate or as a mix polymerizate with vinyl esters, styrene, vinyl ethers, vinyl chloride or vinylidene chloride.

The binding agents which are capable of constituting flocculating agents for the chemisorbent are preferably those of a polyacrylate, polyacrylic ester, acrylic ester mix polymerizate, polyacrylamide or polyethyleneimine base.

The mixing ratio between water insoluble synthetic resin and water soluble or swellable synthetic resin can vary over a wide range as long as the desired characteristics for the coating, set forth above, are achieved. It is possible to vary these proportions to increase hardness and resilience, viscosity or adhesion or to increase capacity or reaction speed.

So that the coating is sufficiently permeable and simultaneously adhesive it has been found to be desirable to use 0.1 to 10% by weight (preferably 1% by weight) water soluble synthetic resin, 10% to 1000% by weight (preferably 200%) of water swellable synthetic resin, the percents being of the amount of water insoluble synthetic resin which is used. The water insoluble synthetic resin should consist in general of about 5 to 20% by weight of the final mixture.

The activity of the coating can be increased when the coating mixture contains soluble or insoluble materials which are partly or completely decomposed and removed from the coating after the latter has been applied to the substrate to produce reaction-promoting pores. Such materials include, for example, simple organic substances such as sugars and urea, soluble salts such as chlorides, sulfates, acetates, oxylates, and the like. Best results, however, are obtained with additives which produce gas with heating or by reaction with acids; such compounds include hydrogen carbonates and carbonates including chalk and dolomite, or sulfates. It will be self understood that mixtures of these pore formers can be used. The quantity of pore formers which can be employed is limited only by the mechanical requirements of the layer although it is preferred to use 50% to 100% by weight of the pre former substances based upon the total weight of dry binder solids.

The thread drawing (filamentary character) of high viscosity solutions and/or suspensions is in general destructive especially when it does not permit a uniform distribution of the chemisorbent. For this reason I prefer to add monomeric or polymeric amines or aminoalcohols which serve additionally as plasticizers, in amounts up to 1000% by weight based upon the water-insoluble synthetic resins. These substances allow uniform distribution of the chemisorbent in the binder mixture.

To the extent that the coating of the mixture containing the chemisorbent upon the substitute is not possible in a single coating operation, this operation may be repeated since the successive coatings bond effectively to one another.

As described in the aforementioned application, it is preferred to carry out the chemisorbent reaction in an adsorber apart from the rest of the electrolyte processing cycle but disposed in the circulating path for the electrolyte. The adsorber can be an adsorption tower packed with the coated substrate and geometrically similar to the well known ion-exchange columns.

It is not essential to remove all of the arsenic, antimony or bismuth from the electrolyte solution with the chemisorbent since it is merely necessary to maintain the concentration of these impurities below the super saturation levels. Consequently, only a portion of the circulated electrolyte need be passed to the adsorber and then returned to the balance of the circulated electrolyte, or only a portion of the electrolyte of the bath need be processed by circulating it through the absorption unit. The latter may thus be made relatively simple and the quantity of electrolyte withdrawn from the electrolytic process can be minimal.

When the chemisorbent is sufficiently charged with electrolyte impurities, it can be regenerated by treatment with acid, e.g. nitric acid, hydrochloric acid or sulfuric acid of higher concentration than the acid in the copper-containing electrolyte.

The arsenic, antimony and bismuth can be recovered from the regenerating acid in another chemisorbent operation using a similar adsorption or by passing the regenerating acid into an electrolytic cell an electrolyzing it with an insoluble anode. The electrolytic regeneration of sulfuric acid utilizes the low solubility of the impurities in sulfuric acid and enables the reuse of the sulfuric acid and recovery of the impurities in concentrated form.

BRIEF DESCRIPTION OF THE DRAWING

The above and other objects, features and advantages of the present invention will become more readily apparent from the following description, reference being made to the accompanying drawing in which.

Specific Description

Figure 1:
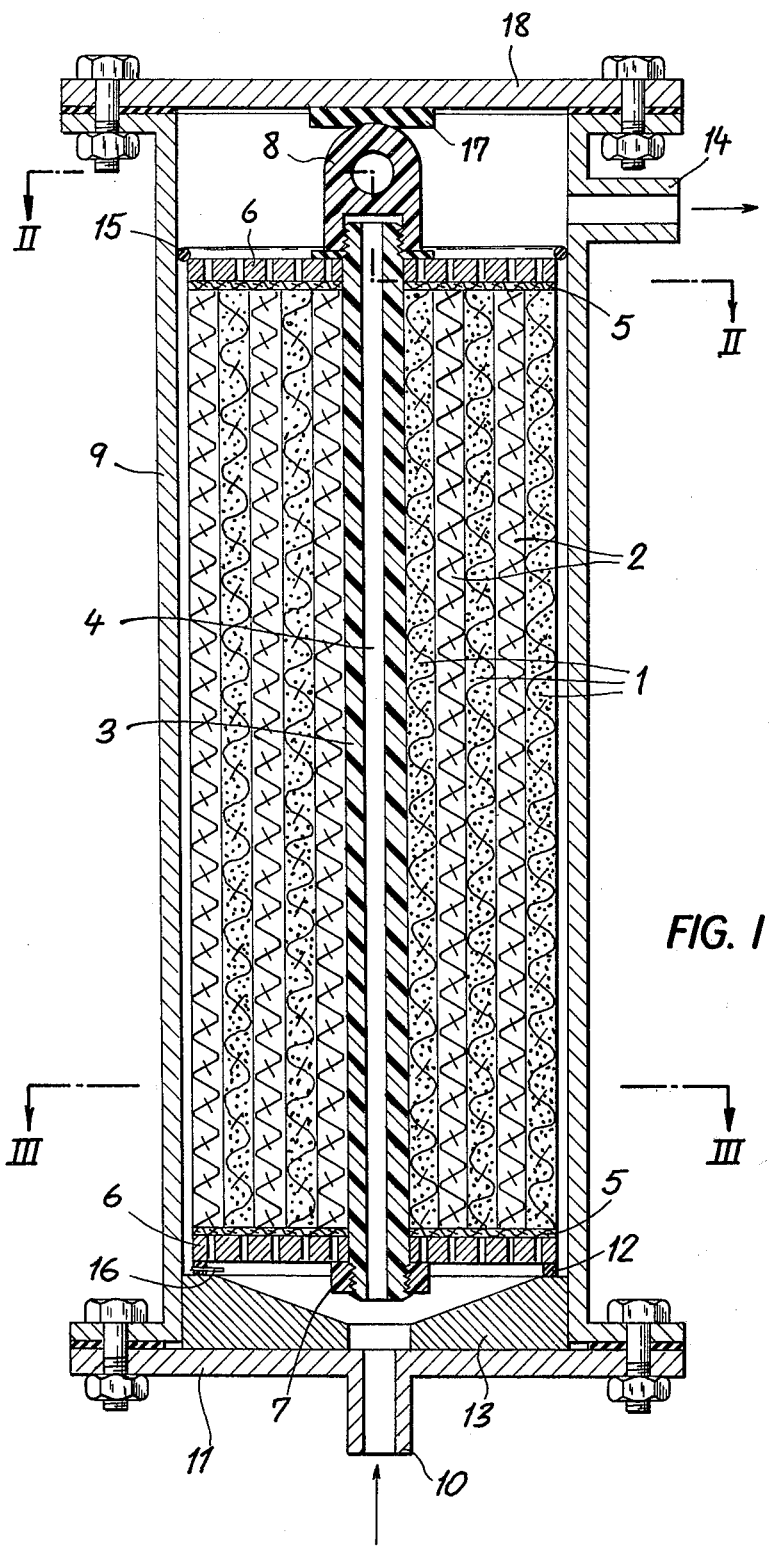
FIG. 1 is a vertical cross-sectional view, partly in diagrammatic form, of an adsorber for carrying out the process of the present invention.
Figure 2:
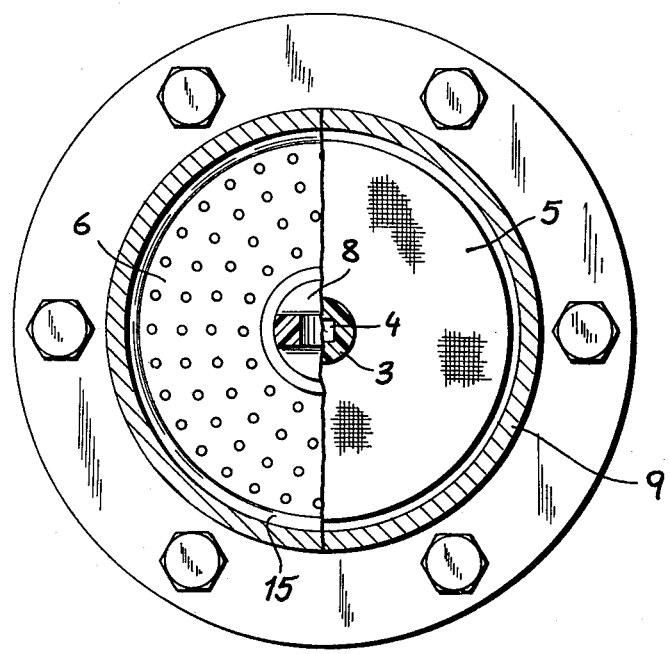
FIGS. 2 and 3 are cross-sectional views respectively taken along the lines II — II and III — III thereof.
Figure 3:
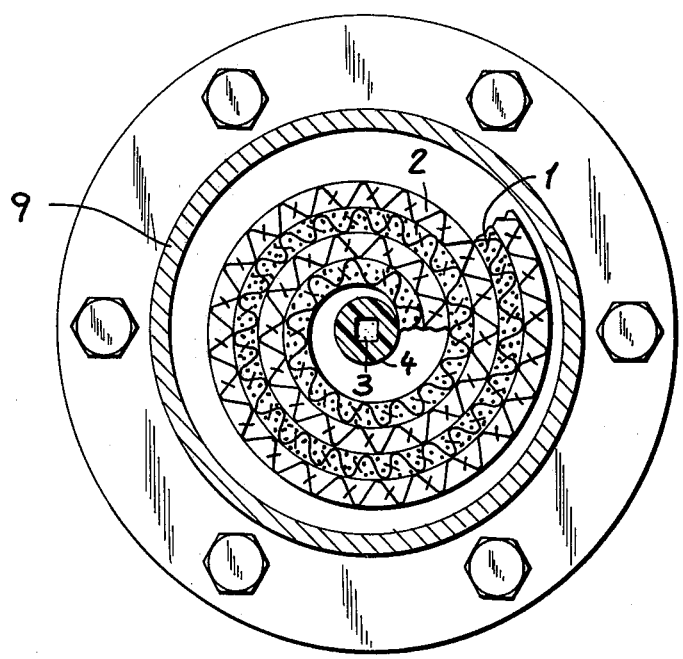

In the drawing 1 show an adsorber for use in a plant of the type described in the aforementioned application to prevent supersaturation of an electrolyte used in nonferrous metal (copper) refining with impurities selected from the group which consists of arsenic, antimony and bismuth.

The adsorber basically comprises a large-mesh net 2 which serves as a spacer between turns of a chemisorbent agent 1, the spacer 2 being shown diagrammatically by zig-zag lines. The chemisorption agent 1 comprises a fabric of one of the synthetic resins mentioned earlier onto which is deposited the chemisorbent, preferably stannic acid ($SnO_2 \cdot xH_2O$). The net 2 is composed of threads of one of the aforementioned synthetic resins having a thickness of 2 mm and a mesh width of 10 mm. The turns of the adsorber are formed by laying the spacer mesh 2 upon a web of the chemisorbent-coated fabric 1 and coiling the resulting stack about a core 3 composed of glass-fiber reinforced polyester resin. A throughgoing passage 4 of rectangular cross-section serves to receive a drying shaft of complementary shape which is rotated to coil the chemisorption web 1 and the net 2 upon the mandrel formed by the core 3.

The upper and lower ends of the fabric coil are closed by liquid distributors 5 composed of wide-mesh fabric and held in place by perforated disks 6 clamped between a nut 7 and an eye 8 threaded onto opposite ends of the core, the eye facilitating lowering of the coil into a cylindrical reaction vessel 9.

At its lower end the reaction vessel 9 is closed by a bottom plate 11 flanged to the cylindrical portion of the housing and formed with a central connecting fitting 10. A downwardly convergent frustoconically concave bottom insert 13 is received between the coil assembly (compact chemisorption agent unit) and the plate 11. A seal 12 is compressed between the bottom plate 6 and the annular insert 10 and thus seals the coil along the exterior thereof.

At the upper end of the coil an O-ring seal 15 is provided between the upper plate 6 and the cylindrical wall of the vessel 9. The upper end of this vessel is, moreover, closed by a plate 18 flanged to the vessel which has a lateral connecting fitting 14 opening into the housing below the plate 18 but above the upper plate 6.

Through the fitting 10 of the flanged bottom 11, liquid is introduced into the reaction vessel and the liquid traverses the bottom perforated plate 6 and the distribution fabric 5, thereafter passing through the individual channels of the fabric of the chemisorption agent 1 and the channels formed by the net 2. The assembly fixes the chemisorbent in place so that no detritus is formed to block the throughflow of electrolyte. The solution traverses the upper distributing fabric 5 and perforated plate 6 and emerges through the fitting 14.

Upon termination of the adsorption process the remaining solution is drained through the lower fitting 10 while the adsorber is vented at 14. Any solution which, in spite of the sealing ring 15, has entered the space between the outermost turn of the fabric 1 and the inner wall of the reaction vessel 9, is drained by a tube 16 in the lower sealing ring 12. To enable the adsorber to be transported without damage to the web 1, a sealing disk 17 is introduced between the cover 18 and the eye 8 of the coil.

SPECIFIC EXAMPLES

Example 1

In 20 grams of a low-viscosity dispersion (25 weight percent) of water insoluble acrylate mix polymerisate of the type used as an acrylic paint base, 0.2 g of a water soluble polyacrylamide flocculating agent (see the aforementioned application) is dissolved and the viscous thread-forming solution is transformed into a salve-like homogeneous mixture with the addition of 50 kg of diethanolamine. This composition, together with 40 kg of a high-viscosity dispersion (50 weight %) of an acrylic ester mix polymer of the water swellable type (as used as a paint base), 65 kg of suction-dried calcium stannate (75 weight %) to which 5 kg of diethanolamine is added to eliminate lumps and to make it flowable, and 1 kg of sodium hydrogen carbonate are intimately mixed.

The resulting mixture is applied in two stages to each side of a 160 cm wide web of a 110 m² preshrunk polyester fabric having a mesh width of 0.5 mm, in an amount of 1.5 kg/m², the web being dried in a circulating-air oven. After drying the web is coiled with a net of a fabric of similar material having a thread thickness of 2 mm and a mesh width of 10 mm to a coil of a diameter of 160 cm and a height of 160 cm. The resulting coil is introduced into a reaction vessel as shown in the drawing.

Initially 1 m³ of a solution of 20% acetic acid and 2% hydrochloric acid is circulated through the adsorber formed by the coil and the reaction vessel. This serves to transform the calcium stannate into the chemisorption agent stannic acid, to break down gas-forming agents and to release the pore formers. The pH of the circulating solution is maintained at about 1.5 by addition of hydrochloric acid using a conventional pH meter. After complete conversion of the calcium stannate, the circulating solution is drained and the adsorber is washed calcium-free with water. Instead of acetic acid it is also possible to use other weak acids which form soluble calcium salts, for example, citric acid and tartaric acid. In this case the addition of hydrochloric acid is not necessary. The acids used can be recovered by treating them with sulfuric acid to precipitate calcium sulfate.

A copper electrolyte is passed through the thus activated adsorber at a rate of 110 m³ in four hours, resulting in the removal of impurities in accordance with the following table:

TABLE 1

Adsorption of As, Sb, Bi from copper electrolyte
Quantity: 110 m³

|  | As | Sb | Bi |
|---|---|---|---|
| kg/m³ before Absorption | 8.04 | 0.35 | 0.055 |
| kg/m³ after Adsorption | 8.00 | 0.30 | 0.050 |
| kg/m³ adsorbed | 0.04 | 0.05 | 0.005 |
| kg adsorbed | 4.4 | 5.5 | 0.55 |

Regeneration is then effected by washing with water after the electrolyte has been drained from the adsorber and passing 55 m³ of a sulfuric acid solution (40 weight % sulfuric acid) through the device. This sulfuric acid solution can be reused a number of times since it loses only about 2 m³ for each regeneration cycle. After each pass through the adsorber, the impurities are removed from the sulfuric acid by electrolysis with an insoluble anode. Regeneration is complete after seven hours. Without washing, the next adsorption cycle follows and recycling through adsorption-washing-regeneration is effected twice daily. After more than three months, the process is still completely effective. The pressure drop across the adsorber does not increase over this period of time.

Example 2

To 20 kg of a 1% by weight solution of water soluble polyacrylamide flocculating agent, 20 kg of triethanolamine and 20 kg of low viscosity dispersion (25% by weight) of paint-base acrylate mix polymerisate (water insoluble), 40 kg of a high viscosity dispersion (50% by weight) of a paint base acrylic ester mix polymerisate (water swellable) and 80 kg of precipitated manganese oxide hydrate (70% by weight) are added and mixed well. Thereafter 0.5 kg of soda, 10 kg of chalk and 2.5 kg of sodium chloride are worked into the mass and the latter is thickened by the addition of 2 kg of polyethyleneimine.

The mixture was coated in two coating steps by side onto a web of 160 cm wide and an area of 110 m² in an amount of 1.5 kg/m². The web was a preshrunk polyester fabric having a mesh width of about 0.5 mm. The web is dried in a circulating air oven and is wound with a knubby foil of polyester into a coil of 67 cm diameter and 160 cm in height. The foil has protuberances having a width of 2 mm and a height of 2 mm. The coil is introduced into a reaction vessel as shown in the drawing.

To release the pore formers and to decompose the gasforming substances, the coil is treated with 5% by weight sulfuric acid and rinsed with water.

The adsorber is used to treat 100 m³ of copper electrolyte over a period of 11 hours with the results shown in the following table:

TABLE 2

Adsorption of As, Sb, Bi from copper electrolyte
Quantity: 100 m³

|  | As | Sb | Bi |
|---|---|---|---|
| kg/m³ before adsorption | 5.00 | 0.40 | 0.10 |
| kg/m³ after adsorption | 4.98 | 0.36 | 0.09 |
| kg/m³ adsorbed | 0.02 | 0.04 | 0.01 |
| kg adsorbed | 2 | 4 | 1 |

As in Example 1, the chemisorbent is regenerated with a sulfuric acid of average concentration (about 40% by weight) and the impurities are recovered by electrolysis with an insoluble anode from the sulfur acid.

I claim:

1. A process for preventing supersaturation of a nonferrous metal refining electrolyte with an impurity selected from the group which consists of arsenic, antimony and bismuth, comprising the steps of coating a chemisorbent specific for said impurity in a water-insoluble acrylic polymerisate binder upon a flat substrate, said chemisorbent being applied to said substrate which is resistant to attack by said electrolyte in a solution or suspension of
   a. a water-insoluble binder consisting of an acrylate ester pure polymerisate or a mixed polymerisate with vinyl esters, styrene, vinyl ethers, vinyl chloride or vinylidene chlorides; and
   b. a flocculating agent for the chemisorbent selected from the group which consists of polyacrylates, polyacrylic esters, acrylic esters, acrylic ester mix polymerisates, polyacrylamides and polyethylene imines;
   forming said substrate into a stack with additional layers of chemisorbent-coated substrate and enclosing said stack in a reaction vessel; and passing said electrolyte through said stack.

2. The process defined in claim 1 wherein said chemisorbent is applied to said substrate in a solution or suspension further containing
   a pore former consisting of at least on soluble or gas-forming substance adapted to produce pores after said mixture has been applied to said substrate.

3. The process defined in claim 2 wherein the electrolyte is circulated through a separate adsorber containing the chemisorbent and introduced into an electrolyte circulating path.

4. The process defined in claim 1 wherein the chemisorbent is regenerated with an acid selected from the group of nitric acid, hydrochloric acid and sulfur acid of higher concentration than the acid in said electrolyte.

5. The process defined in claim 4 wherein the regeneration is carried out with sulfuric acid in the same adsorber as the chemisorption is effected and the impurity collected in the regenerating acid is concentrated and removed by electrolyzing the regenerating acid with a nonsoluble electrode.

6. The process defined in claim 1 wherein said substrate is coiled in successive turns with a large mesh net interposed between said turns.

7. The process defined in claim 1 wherein said substrate is coiled in successive turns with a knubby foil between said turns.

8. The process defined in claim 1 wherein said chemisorbent is selected from the group which consists of manganese oxide, manganese oxide hydrate and stannic acid.

9. The process defined in claim 1 where only a part of an electrolyte traversing the electrolyte circulating path is passed through an adsorber into contact with said chemisorbent and thereafter returned to the remainder of the bath.

* * * * *